(12) United States Patent
Kramer et al.

(10) Patent No.: US 8,239,098 B2
(45) Date of Patent: Aug. 7, 2012

(54) INDUSTRIAL TRUCK, IN PARTICULAR, A LIFT TRUCK

(75) Inventors: Dieter Kramer, Henstedt-Ulzburg (DE); Michael Steiner, Todendorf (DE); Nils von Thienen, Hamburg (DE); Jens Wiegandt, Kamenz (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 687 days.

(21) Appl. No.: 12/392,658

(22) Filed: Feb. 25, 2009

(65) Prior Publication Data
US 2009/0234541 A1  Sep. 17, 2009

(30) Foreign Application Priority Data
Mar. 12, 2008 (DE) .......................... 10 2008 013 915

(51) Int. Cl.
*G06F 19/00* (2006.01)
*B62D 15/02* (2006.01)

(52) U.S. Cl. .............. 701/41; 701/34; 701/50; 180/408; 180/429

(58) Field of Classification Search .................. 701/41, 701/42, 34, 50; 280/93.5, 124.1, 124; 180/6.38, 180/333, 252, 408, 429
See application file for complete search history.

(56) References Cited

U.S. PATENT DOCUMENTS

| | | | | |
|---|---|---|---|---|
| 2,732,022 A | * | 1/1956 | Lapsley | 180/6.28 |
| 5,276,620 A | * | 1/1994 | Bottesch | 701/41 |
| 6,863,144 B2 | * | 3/2005 | Brandt et al. | 180/333 |
| 7,914,024 B2 | * | 3/2011 | Lohmuller et al. | 280/124.1 |
| 2007/0295542 A1 | * | 12/2007 | Raue | 180/6.38 |
| 2008/0011539 A1 | | 1/2008 | Riepold | |
| 2008/0097667 A1 | * | 4/2008 | Brenner et al. | 701/41 |
| 2010/0324778 A1 | * | 12/2010 | Foster et al. | 701/34 |

FOREIGN PATENT DOCUMENTS

| | | |
|---|---|---|
| DE | 195 10 717 A1 | 9/1996 |
| DE | 299 23 362 U1 | 9/2000 |
| DE | 100 13 196 A1 | 9/2001 |
| DE | 101 60 904 A1 | 7/2003 |
| DE | 10 2004 043 402 A1 | 9/2006 |

* cited by examiner

*Primary Examiner* — Ronnie Mancho
(74) *Attorney, Agent, or Firm* — Vidas, Arrett & Steinkraus, P.A.

(57) ABSTRACT

Industrial truck, in particular a lift truck, with a drive axle with drive wheels and a drive motor, a steering axle with two steerable wheels, a target value sensor that is connected to a steering wheel, a steering motor, a steering device which is in effective connection with a steering tie rod, a position transducer magnet whose position is recorded by two magnetic resonance sensors that are arranged in parallel, where the position transducer magnet and the resonance sensors are moved relative to each other during a steering movement of the steering device, and where the magnetic resonance sensors generate counter directional analog signals for the actual value of the steering angle of the steerable wheels, a steering control, connected to the target value sensor, the steering motor, and the magnetic resonance sensors, which evaluates the signals received from the target value sensor and the magnetic resonance sensors, and controls the vehicle steering angle to the target steering angle, where the signals of the magnetic resonance sensors are evaluated by the steering control for the recognition of malfunction of one of the magnetic resonance sensors.

8 Claims, 1 Drawing Sheet

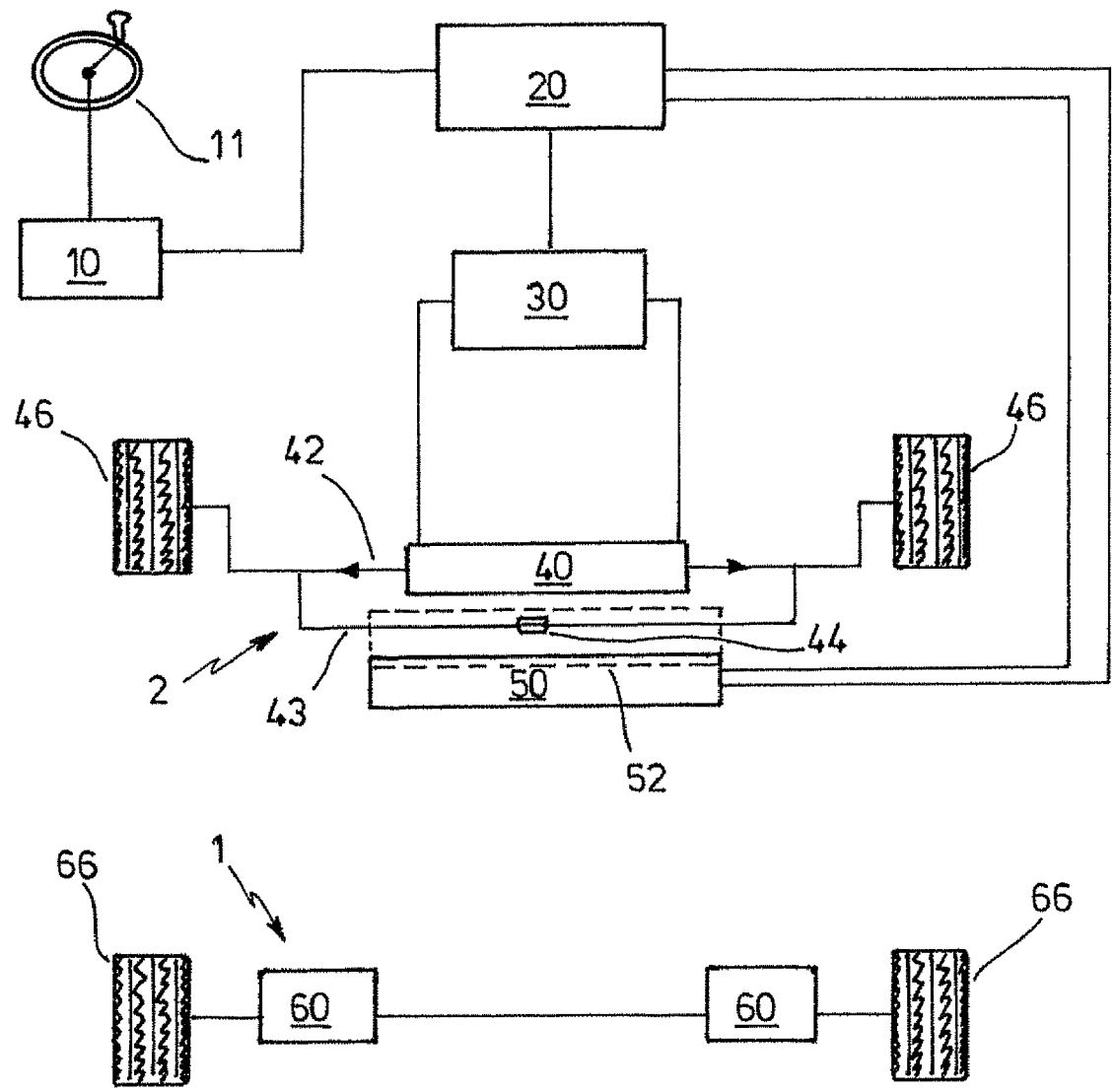

INDUSTRIAL TRUCK, IN PARTICULAR, A LIFT TRUCK

CROSS-REFERENCE TO RELATED APPLICATIONS

Not applicable.

STATEMENT REGARDING FEDERALLY SPONSORED RESEARCH

Not applicable.

BACKGROUND OF THE INVENTION

It is known to use conventional potentiometers for sensing a vehicle steering angle, where the potentiometer is arranged on two elements that are moving relative to each other during steering. Here, the resistance track of the potentiometer is fixed to one of the two elements, and the wiper of the potentiometer is connected to the other element. The divider voltage is measured between the wiper contact and the reference potential as a measure for the relative positions of the two movable elements. A disadvantage of such potentiometer sensors is that the wiper and the resistance track, on the one hand, must remain in contact with each other, and that on the other hand, they must be maintained movable relative to each other. In addition to the wear of the components, this results also in the problem of sealing. In a humid or dirty environment, the electrical properties of the potentiometer can be influenced negatively, or the contact between the wiper and the resistance track can be broken.

DE 299 23 362 U1, the entire contents of which is incorporated herein by reference, discloses a device for position measurement for an industrial truck where a magnetic position transducer is arranged on a movable axle part of the steering axle. On a second, immobile part of the axle, a sensor arrangement is arranged as a group of offset proximity circuit elements that are integrated in an electrical circuit in such a way that they control an output voltage of the circuit in dependence on the position of the position transducer along the sensor arrangement. The resulting characteristic voltage curve has discrete values, that is, the measurement system acts like a potentiometer with step outputs. The position of the position transducer is indicated in discrete steps according to the distance between two proximity circuit elements, that is, it is indicated only inaccurately.

With only one measurement, the known position measurement devices permit no error recognition in the measurement device. Potentiometers require a physical contact of the elements arranged on the movable components of the steering mechanism, the known magnetic position measurement supplies only discrete measurement values. Inaccurate measurement values are also associated with inaccurate input specifications for an electrical differential, which results in an increased tire wear.

DE 101 60 904 B4, the entire contents of which is incorporated herein by reference, discloses a sensor system for the position measurement on a hydraulic cylinder. A magnet is connected to the piston, and a magnetic sensor is connected to the cylinder.

The objective of the invention is to provide an industrial truck with a contactless and analog position measurement device for steering that enables a simple function check.

BRIEF SUMMARY OF THE INVENTION

The industrial truck according to the invention has a drive axle with drive wheels and a drive motor, as well as a steering axle with two steerable wheels. The steerable wheels are moved, for instance via an electro-hydraulic steering device on a steering tie rod of the steering axle, such that the vehicle can perform a corresponding steering move. The steering device is driven by a steering motor that is controlled by a steering control. A target value sensor that is connected to the steering wheel, captures the target steering angle of the vehicle, and transmits it to the steering control. Further, the steering control receives signals from a sensor for the actual value that is arranged on the steering axle, and that captures the actual position of the wheels through sensing the position of the steering tie rod. The steering control calculates a vehicle steering angle from the actual values. Through a comparison of the target values and the actual values, the steering motor is controlled such that the calculated vehicle steering angle corresponds to the target steering angle.

The sensor for the actual value has a position transducer magnet whose position is captured by two magnetic resonance sensors. During a steering movement of the steering rod, the resonance sensors and the position transducer magnet are moved relative to each other, in that one element is arranged on the steering tie rod, and the other element is arranged fixed on the vehicle. Through the counter directional arrangement of the sensors, counter directional signals are generated during the movement of the position transducer magnet, that is, the position transducer magnet moves towards the end of one resonance sensor, and at the same time moves away from the corresponding end of the other resonance sensor. Along with this motion, two continuous counter directional signals are generated which can be used independently to calculate the vehicle steering angle. For each individual signal, the same value must result for the vehicle steering angle, whereby a malfunction of the sensor for the actual value can be discovered. In this process, the two signals of the sensors must always yield a constant value when they are added to each other or subtracted from each other. If this is not the case, a disruption is present. This enables monitoring of the steering control. The electronic components, in particular the sensors, are housed in protective enclosures, such that they function reliably also in a humid or dirty environment. As the sensor system operates contactless, this can be guaranteed easily.

In a preferred embodiment, the magnetic resonance sensors are arranged fixed on the vehicle, and the position transducer magnet is arranged fixed on the steering tie rod so that it moves with a steering movement.

Preferably, the magnetic resonance sensors are arranged fixed on the vehicle, and the position transducer magnet is arranged on a parallel rod that is arranged parallel to the steering tie rod. This way, the sensor system for the actual value can be arranged independently of the constructive requirements of the steering device.

In a preferred embodiment, the steering control issues a stop signal when it recognizes a malfunction in the sensor system for the actual value. This way, the vehicle can be stopped in the case of a failure in the steering sensor system, in order to avoid possible accidents.

In a preferred embodiment, the steering control or another control component calculates a maximum driving speed from the vehicle steering angle, and controls the drive motor accordingly. This way, it can be assured that the vehicle will not tip over while driving in a curve. The maximum driving speed results from the vehicle itself, from the curve radius, and from the load.

Preferably each drive wheel is assigned a drive motor.

In a preferred embodiment, the steering control or another control component uses the vehicle steering angle to calculate rotational speeds corresponding to the curve radius of the drive wheels. The drive motors that each drive a wheel are controlled with a rotational speed that is necessary for the respective drive wheel for the intended curve, to drive the vehicle with rolling drive wheels. Through such a differential, the slip of the drive wheels is adapted to each other, and an increased tire wear is avoided.

Preferably, the front axle is the drive axle, and the rear axle is the steering axle.

BRIEF DESCRIPTION OF THE FIGURE IN THE DRAWING

A preferred embodiment of the industrial truck with a two-channel sensor system for the actual values is explained in more detail in the following, using a drawing.

FIG. 1 is a block diagram of the invention with control elements and sensor system.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated The axle system according to the invention with control elements and sensor system, shown in a rough schematic representation, has a drive axle 1 and a steering axle 2. On the drive axle 1 with the drive wheels 66, each drive wheel 66 is assigned a respective drive motor 60. The steering axle 2, which is preferably the rear axle, has a steering tie rod 42 with wheels 46 steerably attached to it, and a parallel rod 43 attached in parallel to the steering tie rod 42.

Attached to the parallel rod 43 is a position transducer magnet 44 which during a steering movement is moved contactless relative to two magnetic resonance sensors 50, 52 which are arranged fixed on the vehicle in a waterproof housing. The resonance sensors 50, 52 generate analog signals depending on the position of the position transducer magnet 44, and they are arranged such that their signals are counter directional. The signals of the two magnetic resonance sensors 50, 52 are recorded in a connected steering control 20. One of the two signals serves as the actual steering angle for the steering control (not shown).

In addition, the steering control 20 is connected to a target value sensor 10, which is connected to a steering transducer 11 and measures a target steering angle. The signals received by the target value sensor 10, and the signals of the actual value of one channel come together in the steering control 20, and are processed there. The steering control 20 is connected to a steering motor 30, which converts the actuating signals received from the steering control 20, via a steering device 40, using actuating elements. The steering device mechanically shifts (e.g. via a hydraulics) the steering tie rod 42, whereby the vehicle steeling angle is set according to the measure of the target steering angle.

By considering the actual value of the steering angle of the wheels 46, the steering control 20 can control the drive motors 60 respectively such that each motor 60 receives the rotational speed it needs so that the vehicle drives in the curve, according to the curve radius, with rolling wheels, that is, with approximately equal slip for both wheels. In addition, a maximum speed corresponding to the curve radius can be specified.

The resonance sensors 50, 52 can be arranged extended and antiparallel to each other, and measure independently of each other the location of the position transducer magnet 44, or they can be arranged opposite of each other such that they measure the position of the position transducer magnet 44 via the distance to them, where the position transducer magnet 44 is arranged movably between the resonance sensors 50, 52 and the sum of the two measured distances is constant.

With correct measurement of the steering angle, the absolute values of both actual signals must, when added to each other or subtracted from each other, yield a specified value. If this is not the case, the presence of a failure can be concluded. This failure is indicated, and/or leads to a stop of the vehicle.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. An industrial truck, in particular, a lift truck, with a drive axle (1) with drive wheels (66) and a drive motor (60), a steering axle (2) with two steerable wheels (46), a target value sensor (10), which is connected to a steering wheel (11), a steering motor (30), a steering device (40) that is in effective connection with a steering tie rod (42), a position transducer magnet (44) whose position is recorded by two magnetic resonance sensors (50, 52), where the position transducer magnet (44) and the resonance sensors (50, 52) are moved relative to each other during a steering movement of the steering device (40), and where the magnetic resonance sensors (50, 52) generate counter directional analog signals for the actual value of the steering angle of the steerable wheels, a steering control (20), connected to the target value sensor (10), the steering motor (30), and the magnetic resonance sensors (50, 52), which controls and evaluates the signals received from the target value sensor (10) and the magnetic resonance sensors (50, 52), and controls the vehicle steering angle dependent upon the signals of one of the magnetic resonance sensors (50, 52), to be the target steering angle, while both signals of the magnetic resonance sensors (50, 52)

are evaluated by the steering control (20) to recognize a malfunction of one of the magnetic resonance sensors (50, 52).

2. The industrial truck according to claim 1, characterized in that the magnetic resonance sensors (50, 52) are fixed to the vehicle, and the position transducer magnet (44) is arranged on the steering tie rod (42).

3. The industrial truck according to claim 1, characterized in that the magnetic resonance sensors (50, 52) are fixed to the vehicle, and the position transducer magnet (44) is arranged on a parallel rod (43) which is arranged in parallel to the steering tie rod (42).

4. The industrial truck according to claim 1, characterized in that the steering control (20) issues a stop signal when it recognizes a malfunction.

5. The industrial truck according to claim 1, characterized in that the steering control (20), or another control component, calculates from the vehicle steering angle a maximum speed corresponding to the steering position, and controls the drive motor (60) accordingly.

6. The industrial truck according to claim 1, characterized in that each of the drive wheels (66) is assigned a drive motor (60).

7. The industrial truck according to claim 6, characterized in that the steering control (20), or another control component, calculates from the vehicle steering angle rotational speeds corresponding to the curve radius of the drive wheels (66), and controls the drive motors (60) with the rotational speed which is necessary for the respective drive wheel (66) to adapt the slip of the drive wheels (66) to each other.

8. The industrial truck according to claim 1, characterized in that the drive axle (1) is the front axle, and the steering axle (2) is the rear axle.

* * * * *